Feb. 22, 1949.　　　D. J. ROACH ET AL　　　2,462,128
BEET HARVESTING MEANS

Filed April 25, 1944　　　　　　　　2 Sheets-Sheet 1

DAVID J. ROACH, AVERY A. CLARK
AND GEORGE W. RIENKS
INVENTOR.

BY

ATTORNEY

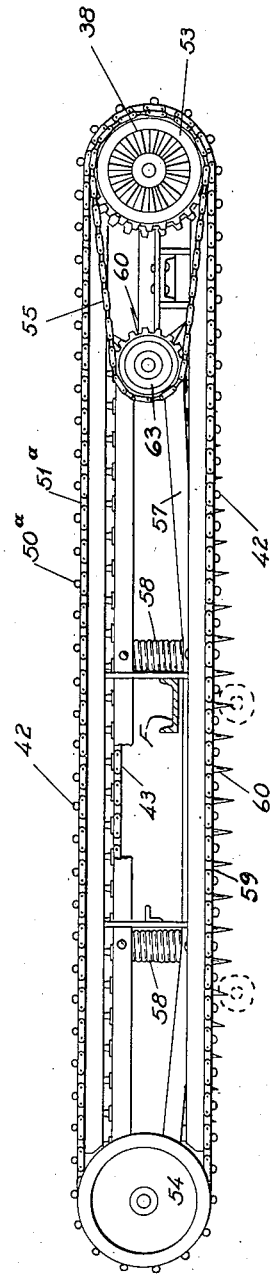
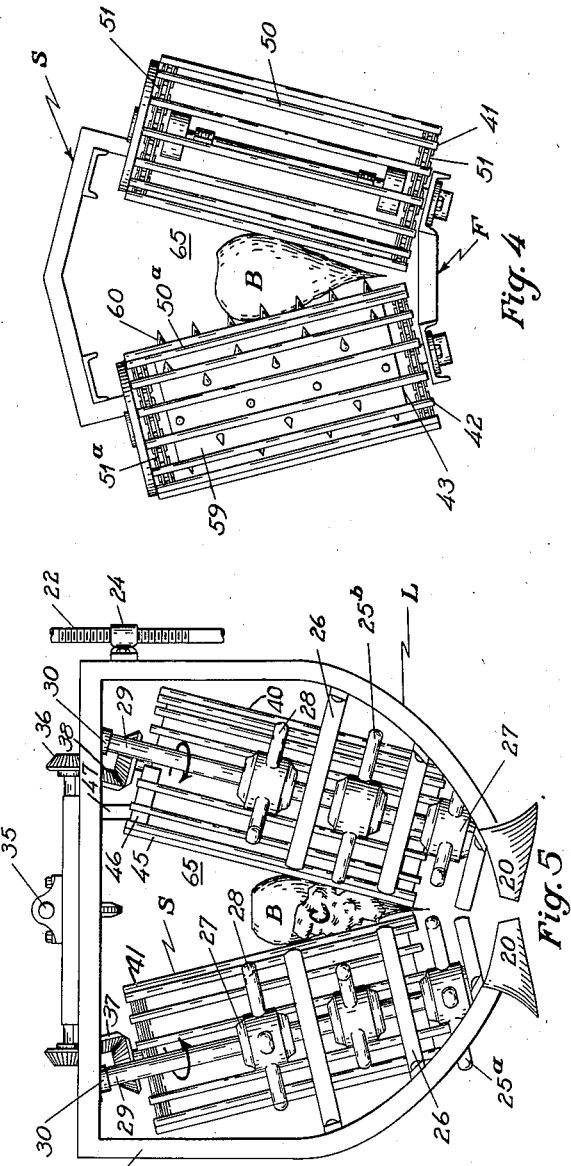
DAVID J. ROACH, AVERY A. CLARK
AND GEORGE W. RIENKS
INVENTOR.
BY
W. A. McGrew
ATTORNEY Patented Feb. 22, 1949

2,462,128

UNITED STATES PATENT OFFICE 2,462,128

BEET HARVESTING MEANS

David J. Roach, Avery A. Clark, and George W. Rienks, Denver, Colo., assignors to The Great Western Sugar Company, Denver, Colo., a corporation of New Jersey Application April 25, 1944, Serial No. 532,594

20 Claims. (Cl. 55—108)

This invention relates to loader and sorter mechanism of the type particularly suited for the treatment of sugar beets.

In the past, many types of beet harvesters and loaders have been used in beet harvesting operations, but the chief difficulty with such prior designs has been that they have not effectively separated the beets from associated earth and clods with which they are lifted from the field in which they were grown.

Furthermore, many of the devices used in the past have given satisfactory service in collecting and sorting beets in certain soils, but have been ineffective in other soils. The combined effects of irrigation and strong sun on a clayey soil, for example, give such a hard consistency to the surface soil around the beets in a field that the harvesting operation will produce numerous clods of substantially the same size as the beets and, to some extent, of corresponding contour. Consequently, the loading or harvesting mechanism to be effective must provide an adequate separation of such clods from the beets.

It is an object of the present invention to provide wheel-supported means for digging beets and for separating said beets from clods associated with the beets in the digging action.

Another object is to provide separating means which convey and discharge oversize rocks without injury to operating parts.

A further object of the invention is to provide beet collecting and separating mechanism which efficiently sorts and segregates beets from clods of substantially the same size and shape, regardless of their consistency.

Other objects reside in novel details of construction and novel combinations and arrangements of parts, as will appear more fully in the course of the following description.

The accompanying drawings illustrate a preferred embodiment of the invention. In the drawings in the several views of which like parts have been designated similarly, Fig. 1 is a partially broken side elevation of a combined beet digger and separator mechanism showing the relative position of the beets and clods in the discharge action;

Fig. 3 is an enlarged top plan view of the beet spiking assembly of the mechanism shown in Fig. 2;

Fig. 4 is an enlarged end elevation of the mechanism looking in the direction of the arrows 4—4, Fig. 1; and Fig. 5 is an enlarged end elevation of the mechanism looking in the direction of the arrows 5—5, Fig. 1.

Figure 1:
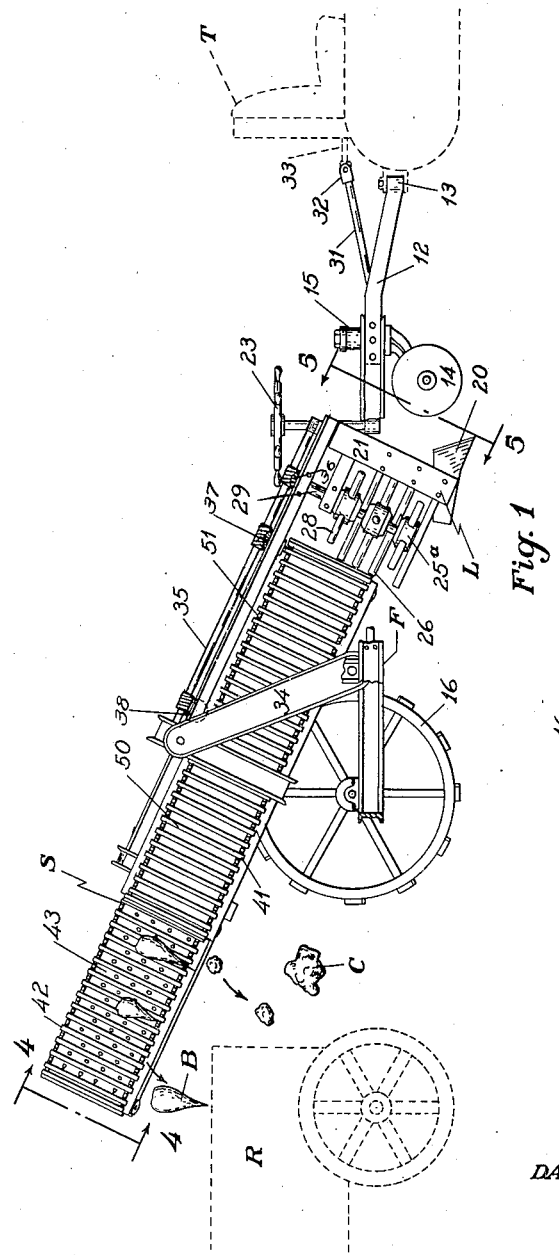

The combined digger-separator mechanism comprises a wheel-supported frame F on which is mounted beet lifting and collecting means L and a separator S. Preferably the mechanism is drawn by a tractor T and the collected beets are discharged into a receptacle R such as a wagon box.

At its forward end the mechanism has a draw bar 12, preferably in the form of a yoke, which has means 13 for its attachment to the tractor T, and means for loosening beets and clearing the soil, preferably comprising a double disc member 14, is mounted for pivotal movement on frame F and serves as the forward wheel mounting of said frame when it is being used in the digging operation. A rear wheel assembly 16 provides the main wheel support for the mechanism.

The beet lifting and collecting means L includes a pair of plow blades 20 supported at the lower end of a yoke-like frame member 21 which may be selectively elevated by means of a screw 22 carrying an adjusting wheel 23, which screw travels lengthwise relative to a nut 24, as in Fig. 5 fixedly held on frame 21, thereby to change the operating position of blades 20.

A pair of right and left hand pick-up members designated generally by the reference numerals 25a and 25b are disposed on frame F in a position to act on beets B elevated from the field by the plow blades 20 and to move same into separator S. These members include a series of vertically-spaced guard bars or slots 26 between which hub members 27 having a series of radial arms 28 are held on rotary shafts 29 journaled on the frame. These members rotate in opposite directions as indicated by the arrows in Fig. 5.

The separator S comprises clod-reducing means, preferably consisting of a stationary screen or grid member 40 and a second screen or grid member 41 mounted for movement relative to said stationary member, and separating means, preferably consisting of the movable member 41 and a cooperative assembly of a second movable screen member 42 and a beet-retaining member 43 mounted for synchronous movement with said screen 42.

Operation of the aforesaid movable parts of the mechanism is provided by a driving assembly comprising a driven shaft 31 having means 32 for its connection to the power-take off unit 33 of tractor T, for example. Shaft 31 operates a chain and sprocket assembly 34 to drive a line shaft 35 journaled at the top of frame F, and this shaft actuates a gear assembly 36 to operate the rotary parts of the pick-up members 25a and 25b, a second gear assembly 37 to operate the movable screen 41, and a third gear assembly 38 to operate the movable screen member 42 and beet-retaining member 43 as will be explained in more detail hereinafter.

In the preferred construction illustrated in the drawings, the stationary screen member 40 comprises a series of upright bars or slats 45 supported from upper and lower beams 46 fixed on frame F by straps or lugs 47. The movable member 41 preferably comprises an endless screen or grid member rotated by upper and lower sprocket-type drive sheaves 48 and turning about upper and lower idler sprockets 49 adjacent the opposite end of frame F. This screen or grid is formed by a series of upright bars or slats 50, welded or otherwise secured to selected links of upper and lower chains 51.

The screen member 42 is similarly constructed and is driven by upper and lower sprocket type sheaves 53 and turns about idler sprockets 54 at the discharge end of the assembly. Upright bars 50a form the grid pattern and are mounted on selected links of upper and lower chains 51a. The inner stretch of the screen 42 forms an extension of the stationary screen 40 and also cooperates with the endless spiking member 43 in the beet discharge action.

The member 43 preferably comprises an endless belt or strip 59 having a series of spike members 60 positioned to mesh with the openings of screen 42. To this end, the strip turns around a sprocket driven drum 63 driven by sprocket 53 through the intermediary of a chain 55 which synchronizes the movement of member 43 to coincide with the movement of screen member 42. If desired, the strip 59 may comprise top and bottom endless chain members interconnected by spike-carrying elements attached to said chains.

The strip 59 turns around an idler drum (not shown) mounted on the same shaft as idler 54 and the inner stretch of the strip 59 extending between said drums is bowed through the provision of a guide strip 57 held in the position shown in Fig. 3 by coil springs 58. The resistance of the springs serves to maintain the spikes in the central zone of the inner stretch extended through the openings in screen 42, while the shape of the guide 57 serves to bring the spikes into and out of said position in their rotary movement.

Figure 2:
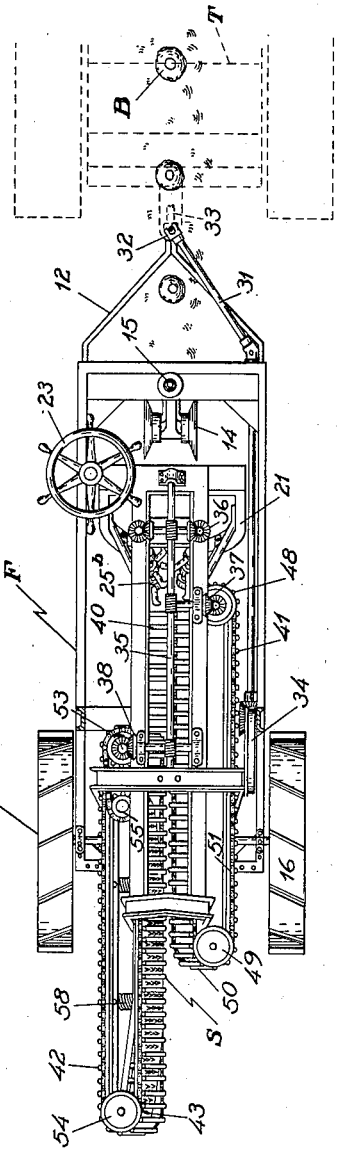
Fig. 2 is a top plan view of the mechanism shown in Fig. 1 with the beets and clods omitted.

With this understanding of the arrangement of the parts constituting the preferred embodiment of the invention, the operation will be described. After attaching the draw bar 12 to the tractor T, handwheel 23 is operated to provide a proper operating position for the plow blades 20. The tractor straddles a row of beets B (Fig. 2) positioning the dual disc member 14 in a straddling position also, and these blades serve to loosen the soil around the beet roots as they move along the row, and also to clear leafy matter or the like from the paths of the plow blades 20.

The cleared and loosened beets are then lifted above the surface by the plows 20 and passing rearwardly in this action are moved by the blades 28 into the V-shaped space or passage 65 between stationary screen 40 and the movable screen 41. The latter impels the beets rearwardly in a rapid spinning movement which tends to break loose adhering soil and substantially clean the surface of the beets. Some earth clods also pass into the space 65 and for the most part are broken by the spinning action and drop out of the enclosure. Those clods that aren't broken sufficiently to drop out finally are moved beyond the end of member 41 and fall by gravity back onto the field.

However, the beets B approaching the rear end of passage 65 are wedged and firmly held between the screens 41 and 42 and as the spikes 60 move through screen 42 they penetrate the beets so held and effectively suspend them against gravitational displacement. Subsequently, as the spikes recede from screen 42 the beets are unable to follow, due to the close spacing of slats 50a, and when the spikes are fully withdrawn, the beets fall by gravity into some suitable receptacle, such as wagon box R.

This lengthwise spacing of the points of discharge of the clods C and beets B provides a clean and complete separation. The depth of the space 65 permits beets throughout a wide range of sizes to be transported under equivalent influences so that a substantially uniform cleaning action is attained irrespective of size. Thus, the conveyor tends to segregate the beets in accordance with size, since smaller beets will be carried along further down in the V than larger beets, so that each beet is held securely, but remains in a vertical position, for effective engagement by the spikes. In addition, as adhering earthy matter is separated from each beet, it tends to move further downwardly in the V, so that the spinning action imparted to the beets is maintained, irrespective of size of beets or amount of adhering earthy matter.

From the foregoing description of the sorting action, it will be apparent that mechanism embodying features of the present invention is well suited for use in harvesting beets from the various types of soils in which they are grown. Even when clods of tough and hard consistency are collected and fed into the mechanism along with beets of substantially the same size and shape, the spiking action tends to break but does not hold such clods and the resulting sorting action is effective to produce a substantially clean separation permitting the beets to be collected separately for subsequent processing.

Another feature of considerable benefit which is provided in the mechanism hereinbefore described resides in the provision of a spring support of the guide strip 57. The beets are frequently grown in rocky soils, with the result that mechanical digging will cause some large size rocks to be taken into the mechanism. The effect of the penetration of the spikes 60 through screen 42 is to narrow the V-shaped passage 65 in the area of penetration and an oversize rock reaching this point normally would cause considerable damage to the spikes 60 and associated parts. However, when any unusual resistance is encountered in excess of that normally met by the beet penetrating action, the springs 58 are compressed permitting the guide strip 57 and the projecting spikes 60 to recede through screen 42 and the rock is thus passed to discharge without damage to the mechanism. As soon as the obstruction has passed, the springs return the guide strip to the normal position illustrated in Fig. 3 and thereafter the mechanism continues to function in the manner hereinbefore described.

In the drawings the position of the trailer unit R has been shown as directly behind the separator mechanism. It should be understood that a cross conveyor may be provided to receive the beet discharge and to conduct the same to a truck or trailer following beside the frame F or to discharge in windrows at the side of the worked row of beets.

It also will be apparent that the mechanism described and illustrated may be used as a loader in picking up beets already removed from the ground. In such operations, clods of earth and/or rocky matter will be picked up with the beets and the hereinbefore described separation will be highly beneficial in sorting the beets from any such associated earth or rocks.

In the preferred practice of the invention, the beets will be topped in a preceding operation, which may be either manual or mechanized, and the apparatus herein described will be utilized in lifting the topped beets from the earth and attaining the desired separation. However, it should be understood that, if desired, topping mechanism may be mounted on the frame forwardly of the discs 14, and in such event the combined steps of topping, digging and separating will be performed in a single pass through the row of beets.

The present invention represents an improvement in first impelling the beets through the V-shaped passage with more rapid rotation which serves to wipe the beet surfaces against the slats of the grid and more effectively remove adhering earth therefrom. The same rotary action also has a tendency to cause a disintegration of most clods, but even when such clods remain intact the subsequent spiking action and differential discharge provides the necessary sorting by which the beets are cleanly separated from the clods.

Where the term "earthy matter" is used in the description and claims, it is intended to include field soil, rocks or stones, or other matter foreign to beets which possesses corresponding properties.

While the primary purpose of the present invention is to provide mechanical digging and sorting of sugar beets, certain of the features of the invention are well suited for other uses. Thus, the cleaning and sorting action may be utilized in fixedly installed mechanism at sugar factory locations, receiving stations, piling grounds and the like. For example, such mechanism may be associated with the beet pilers now in use, in order to reject all earthy matter carried with the beets to such locations.

It will be understood from a consideration of all these features that while the invention will have its greatest application in the treatment of sugar beets, many of the arrangements and treatments hereinbefore described will apply also to the sorting of other objects having properties corresponding to beets. Therefore the term "beets" is used in the specification with the intention that it shall apply to all such objects.

While the drawings illustrate a preferred embodiment of the invention, it will be apparent that a variety of lifting and conveying means may be employed in place of the structure shown and, similarly, the equivalent separating action can be attained by means other than those illustrated. Further, the mechanism may be built as a self-propelled vehicle, if desired, and various means may be provided for receiving the beet discharge. All such modifications are within the contemplation of the present invention, the scope of which is defined by the hereunto appended claims.

What we claim and desire to secure by Letters Patent is:

1. Mechanism of the character described, comprising a first longitudinally movable grid laterally inclined to the vertical; a relatively stationary opposite grid laterally inclined in the opposite direction, and extending along a portion of said first movable grid; a second longitudinally movable grid also inclined laterally oppositely to said first movable grid and extending from said stationary grid to a point beyond the end of said first movable grid; and spiking means associated with said second movable grid for impaling beets and moving the same to a point adjacent the end of said second movable grid.

2. Beet treating apparatus comprising a stationary laterally inclined grid; a first movable grid mounted for loop movement, and laterally inclined opposite to said stationary grid, said first movable grid extending to a point beyond the end of said stationary grid, and the relative movement between said stationary grid and said first movable grid imparting a spinning action to said beets tending to dislodge earthy matter; a second movable grid disposed as an extension of said stationary grid and extending to a point beyond the end of said first movable grid, thereby causing earthy matter to be discharged by gravity at the end of said first movable grid; and belt means movable in synchronism with said second movable grid and provided with a plurality of spikes adapted to extend through said second movable grid, said belt means being constructed and arranged so that said spikes extend through said second movable grid adjacent said stationary grid to impale beets thereon and said spikes withdraw through said second movable grid adjacent the opposite end thereof to cause said impaled beets to be discharged.

3. Mechanism of the character described, comprising conveying means having sides laterally inclined in opposite directions from the vertical and positioned in relative opposed movable and stationary relation to form a trough open at its top and bottom, said bottom opening being restricted sufficiently to prevent gravitational descent of beets therethrough, at least a portion of said conveying means on one side thereof moving relative to the corresponding portion on the opposite side at a sufficiently different rate to cause a spinning action to be imparted to beets and thereby tend to remove and disintegrate earthy matter during gravitational descent through said restricted bottom opening, and one side of said conveying means extending for a greater distance than the opposite side to permit earthy matter to fall by gravity, and spiking means associated with the extending side of said conveying means for impaling said beets so as to move said beets to a point of discharge beyond the gravity discharge of earthy matter.

4. Mechanism of the character described, comprising a wheel-supported frame, means arranged on the frame in a position for lifting beets from the earth, means also on the frame positioned to receive the lifted beets and associated earthy matter from said lifting means, conveying means supported by said frame for moving said beets and earthy matter to an elevated point of discharge on said frame, and means moving into position to extend through said conveying means for a predetermined length of time during a portion of the travel of said conveying means for impaling and moving the beets while thus impaled to a point of discharge beyond the ultimate point of discharge of such earthy matter at the terminus of said conveying means, whereupon said impaling means move out of said extended position.

5. Mechanism of the character described, comprising conveying means having sides laterally inclined in opposite directions from the vertical and positioned to form an upwardly open trough, said conveying means comprising a first and a second portion, one side of said first portion moving relative to the other side at a sufficiently different rate to cause a spinning action to be imparted to beets and thereby tend to remove earthy matter, one side of said second portion extending for a greater distance than the opposite side to permit earthy matter to fall by gravity, and spiking means associated with the extending side of said second portion of the conveying means for impaling said beets so as to move said beets to a point of discharge beyond the gravity discharge of earthy matter.

6. Mechanism of the character described as defined in claim 5, wherein said conveying means includes a screen member having spaced grids, and said spiking means includes spikes adapted to extend through said screen member in the spaces between said grids.

7. Mechanism of the character described, comprising a wheel-supported frame and beet collecting means on the frame in a position to lift beets from a field, a pair of opposed members at least one thereof being movable extending away from the beet collecting and lifting means for conveying the collected beets and associated earthy matter along a course to an elevated point of discharge, and beet-impaling members located adjacent said point of discharge constructed and arranged to move into position to project through spaces between portions of a member to engage and hold the beets against discharge by gravity during continuance of said conveying movement for an interval longer than the interval required in the gravitational discharge of said earthy matter.

8. Mechanism of the character described, comprising a wheel-supported frame and beet collecting means on the frame in a position to lift beets from a field, opposed members extending away from the beet collecting and lifting means for conveying the collected beets and associated earthy matter along a course to an elevated point of discharge, a portion of one of said members providing means constructed and arranged to cooperate with another of said members in removing adhering earthy matter from the surfaces of said beets, and a plurality of movable beet-impaling members projectable through another portion of said first-named member and providing means adjacent said point of discharge for holding the beets against discharge by gravity during continuance of said conveying movement for an interval longer than the interval required in the gravitational discharge of said earthy matter.

9. Mechanism of the character described, comprising a wheel-supported frame and beet collecting means on the frame in a position to lift beets from a field, conveyor means disposed adjacent the collecting means for conveying the collected beets and associated earthy matter along a course to an elevated point of discharge, and beet-engaging means disposed within a portion of the conveyor means and adjacent said point of discharge, said beet-engaging means including impaling members projectable through said portion of the conveyor means for a predetermined period of time to hold the beets against discharge by gravity for an interval longer than the interval required in the gravitational discharge of said earthy matter and to release said beets at the termination of said holding interval, and thereby separate the beets and the earthy matter.

10. Combined beet digging and separating mechanism, comprising a wheel-supported frame adapted for attachment to a tractor or the like, a pair of discs held at the forward end of said frame in position to straddle a row of beets in a field along which the frame is moved, plow means rearwardly of the discs held on the frame in an earth-penetrating position to lift the beets from the ground, beet-collector mechanism disposed on the frame at the rear of the plow means and including two cooperative members arranged in a position to provide a V-shaped passage into which the beets and associated earthy matter are moved, one of said members being movable relative to the other to convey the beets lengthwise of said passage, and beet-impaling means supported by said frame adjacent the rear end of said passage projectable into said V-shaped passage at a predetermined time, said beet-impaling means being constructed and arranged to hold the impaled beets against discharge by gravity during continuance of said conveying movement for an interval longer than the interval required in the gravitational discharge of said earthy matter, and thereby separate the beets and the earthy matter.

11. Combined beet digging and separating mechanism, comprising a wheel-supported frame adapted for attachment to a tractor or the like, plow means at the forward end of the frame held in earth-penetrating position to lift the beets from the ground, beet-collector mechanism disposed at the rear of the plow means and including two cooperative members arranged in a position to provide a V-shaped passage into which the beets and associated earthy matter are moved, at least one of said members being movable to convey the beets lengthwise of said passage, and means supported by said frame adjacent the rear end of said passage constructed and arranged to hold the beets during continuance of said conveying movement against discharge by gravity for an interval longer than the interval required in the gravitational discharge of said earthy matter, said means being normally disposed within one of the cooperative members and having beet-impaling members projectable therethrough into contact with the beets to hold the same during said longer interval.

12. Combined beet digging and separating mechanism, comprising a wheel-supported frame adapted for attachment to a tractor or the like, plow means at the forward end of the frame held in earth-penetrating position to lift the beets from the ground, beet-collector mechanism disposed at an upward inclination from the rear of the plow means and including two cooperative members arranged in a position to provide a V-shaped passage into which the beets and associated earthy matter are moved, at least one of said members being movable to convey the beets lengthwise of said passage, and means supported by said frame adjacent the rear end of said passage constructed and arranged to hold the beets during continuance of said conveying movement against discharge by gravity for an interval longer than the interval required in the gravitational discharge of said earthy matter, said means being normally disposed within one of the cooperative members and having beet-engaging and supporting members, said last-named members being positively projected from within the said cooperative member during said longer interval.

13. Combined beet digging and separating mechanism, comprising a wheel-supported frame adapted for attachment to a tractor or the like, plow means at the forward end of the frame held in earth-penetrating position to lift the beets from the ground, means for changing the effective elevation of said plow means, beet-collector mechanism disposed at the rear of the plow means and including two cooperative members arranged in a position to provide a V-shaped passage into which the beets and associated earthy matter are moved, at least one of said members being movable to convey the beets lengthwise of said passage, and means supported by said frame adjacent the rear end of said passage constructed and arranged to hold the beets during continuance of said conveying movement against discharge by gravity for an interval longer than the interval required in the gravitational discharge of said earthy matter, said beet holding means including a plurality of spaced beet-impaling members travelling normally outside said V-shaped passage but being projected into said passage to hold beets during said longer interval.

14. Combined beet digging and separating mechanism, comprising a wheel-supported longitudinal frame adapted for attachment to a tractor or the like, plow means at the forward end of the frame held in earth-penetrating position to lift the beets from the ground, beet-collector mechanism disposed at the rear of the plow means and including two cooperative members arranged in position to provide a V-shaped passage into which the beets and associated earthy matter are moved, at least one of said members being movable to convey the beets lengthwise of said passage, said passage being of substantially greater depth than the maximum length of a sugar beet, whereby to accommodate all sizes of field grown beets, and travelling means supported by said frame adjacent the rear end of said passage constructed and arranged to move bodily transversely of said frame into position to impale and hold the beets during continuance of said conveying movement against discharge by gravity for an interval longer than the interval required in the gravitational discharge of said earthy matter.

15. Combined beet digging and separating mechanism, comprising a wheel-supported frame adapted for attachment to a tractor or the like, plow means at the forward end of the frame held in earth-penetrating position to lift the beets from the ground, beet-collector mechanism disposed at the rear of the plow means and including two cooperative members arranged to provide a V-shaped passage into which the beets and associated earthy matter are moved, at least one of said members being movable to convey the beets lengthwise of said passage, said passage being of substantially greater depth than the maximum length of a sugar beet, whereby to accommodate all sizes of field grown beets, and means supported by said frame adjacent the rear end of said passage constructed and arranged to hold the beets at various elevations in said passage against discharge by gravity for an interval longer than the interval required in the gravitational discharge of said earthy matter, said last-named means including members normally disposed outside said V-shaped passage but projectable thereinto at a predetermined time to releasably support the beets during said longer interval.

16. Mechanism of the character described, comprising conveying means having sides laterally inclined in opposite directions from the vertical and positioned to form an upwardly open trough, at least a portion of said conveying means on one side thereof being stationary so as to cause a spinning action to be imparted to beets disposed between the inclined sides and thereby tend to remove earthy matter, and one side of said conveying means extending for a greater distance than the opposite side and being movable whereby to permit earthy matter to fall by gravity; and spiking means associated with the movable extending side of said conveying means for impaling said beets, so as to move said beets to a point of discharge beyond the gravity discharge of earthy matter.

17. Mechanism of the character described, comprising means laterally inclined in opposite directions from the vertical and positioned to form an upwardly open trough for conveying beets and associated earthy matter longitudinally thereof from a point of entrance to a point of discharge in which said means comprises relatively movable cooperative conveyer elements; means associated and cooperable with one of the movable conveyor elements for separating said beets from earthy matter by permitting such earthy matter to fall by gravity while moving said beets to a point of discharge spaced from the point of discharge of such earthy matter, said means including spiking means also associated with one of the movable conveyor elements for impaling said beets; and resilient means associated with and located behind the spiking means for supporting said spiking means so as to permit portions of said spiking means to be moved laterally upon encountering a rock, or the like.

18. In mechanism of the character described, two grid members arranged to incline oppositely from the vertical and form an open bottomed passage into which beets and some earthy matter are fed, at least one of said members being arranged to move lengthwise of said passage relative to the other member so as to spin the beets during their movement through the passage and dislodge earthy matter from the beets, and beet-supporting means comprising a plurality of impaling pins arranged to move conjointly with said movable grid member throughout at least a portion of said passage and to support said beets during continuance of said movement beyond the passage, whereby earthy matter will fall by gravity at the end of said passage and thus be separated from the beets.

19. In mechanism of the character described, two grid members arranged to incline oppositely from the vertical and form an open bottomed passage into which beets and some earthy matter are fed, at least one of said members being arranged to move lengthwise of said passage relative to the other member so as to spin the beets during their movement through the passage and dislodge earthy matter from the beets, and beet-supporting means arranged to extend through the movable grid member and move conjointly therewith throughout at least a portion of said passage and to support said beets during continuance of said movement beyond the passage, whereby earthy matter will fall by gravity at the end of said passage and thus be separated from the beets, said beet-supporting means comprising a strip having a plurality of outwardly projecting beet-impaling pins thereon.

20. In mechanism of the character described, two grid members arranged to incline oppositely from the vertical and form an open bottomed passage into which beets and some earthy matter are fed, at least one of said members being arranged to move lengthwise of said passage relative to the other member so as to spin the beets during their movement through the passage and dislodge earthy matter from the beets, beet-supporting means including an endless support and a plurality of spikes projecting outwardly therefrom and being arranged to extend through the movable grid member and move conjointly therewith throughout at least a portion of said passage and to support said beets during continuance of said movement beyond the passage, whereby earthy matter will fall by gravity at the end of said passage and thus be separated from the beets, and means for retracting the beet-supporting means after the beets have been conveyed to a point substantially spaced from the end of said passage.

DAVID J. ROACH.
AVERY A. CLARK.
GEORGE W. RIENKS.

REFERENCES CITED

The following references are of record in the file of this patent:

UNITED STATES PATENTS

| Number | Name | Date |
|---|---|---|
| 792,961 | Beach | June 20, 1905 |
| 917,769 | Kile | Apr. 13, 1909 |
| 1,026,835 | Smith | May 21, 1912 |
| 1,153,381 | Gudmundsen | Sept. 14, 1915 |
| 1,276,441 | Tacy | Aug. 20, 1918 |
| 1,290,049 | Bass | Jan. 7, 1919 |
| 1,431,814 | Kanengieter | Oct. 10, 1922 |
| 1,694,817 | Gudmundsen | Dec. 11, 1928 |
| 1,715,823 | Dick | June 24, 1929 |
| 1,837,077 | Siepp | Dec. 15, 1931 |
| 1,964,896 | Urschel | July 3, 1934 |
| 2,013,502 | Phillips | Sept. 3, 1935 |

FOREIGN PATENTS

| Number | Country | Date |
|---|---|---|
| 320,838 | France | Aug. 26, 1902 |
| 40,792 | Denmark | Sept. 16, 1929 |
| 41,732 | Denmark | Mar. 3, 1930 |
| 50,660 | Denmark | Sept. 16, 1935 |